United States Patent [19]

Rand

[11] 4,228,978
[45] Oct. 21, 1980

[54] RECREATIONAL VEHICLE SEWER HOSE SUPPORT

[76] Inventor: Roger Rand, 3810 N. Romero, Tucson, Ariz. 85705

[21] Appl. No.: 951,361

[22] Filed: Oct. 16, 1978

[51] Int. Cl.² .............................................. F16L 3/00
[52] U.S. Cl. ..................................... 248/49; 138/106; 248/74 B; 248/75
[58] Field of Search ............ 248/49, 60, 75, 80, 248/83, 85, 87, 150, 136, 139, 74 B; 138/106, 107, 110; 137/144

[56] References Cited

U.S. PATENT DOCUMENTS

| | | | |
|---|---|---|---|
| 3,165,286 | 1/1965 | Johnson et al. | 248/49 UX |
| 3,336,617 | 8/1967 | Bosko et al. | 403/108 X |
| 3,493,204 | 2/1970 | Prouty | 248/49 |
| 3,572,622 | 3/1971 | Smith | 248/49 |
| 3,730,228 | 5/1973 | Gibbs | 248/49 X |
| 3,809,348 | 5/1974 | Di Laura | 138/106 X |
| 3,810,490 | 5/1974 | Ludwick | 138/106 |
| 3,819,137 | 6/1974 | Smith | 248/49 |
| 4,082,242 | 4/1978 | Smith | 138/106 X |
| 4,102,523 | 7/1978 | Finnell | 248/49 |
| 4,125,237 | 11/1978 | Hagins | 138/106 X |

Primary Examiner—J. Franklin Foss
Attorney, Agent, or Firm—Gregory J. Nelson

[57] ABSTRACT

A support for a flexible sewer hose attached to an RV. The support has at least two elongate, semi-circular sections which are relatively slidable to adjust the length of the support. Fastening means lock the sections once adjusted. The support is secured to the hose by flexible ties or securement means attachable to the hose.

1 Claim, 6 Drawing Figures

U.S. Patent    Oct. 21, 1980    4,228,978
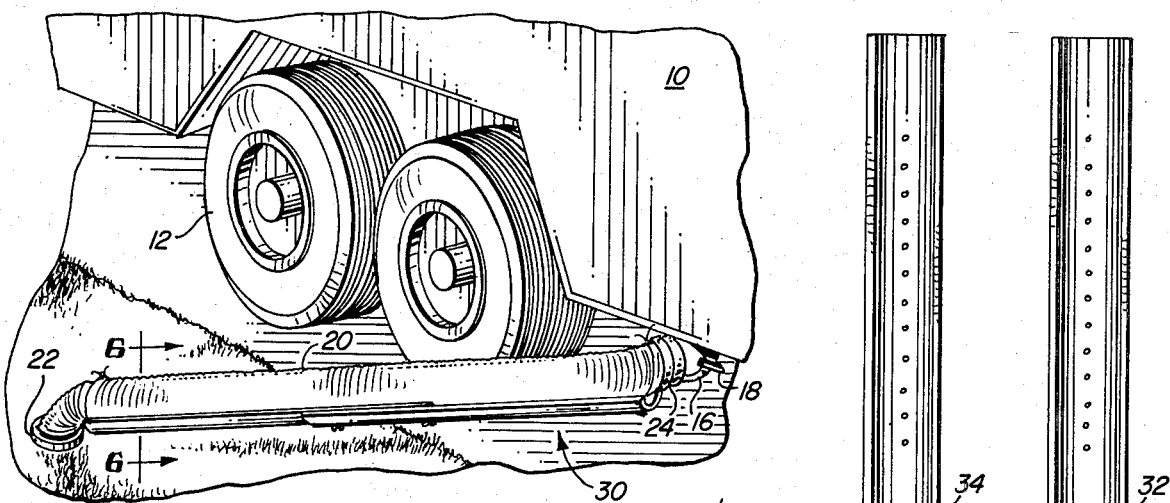
FIG-1
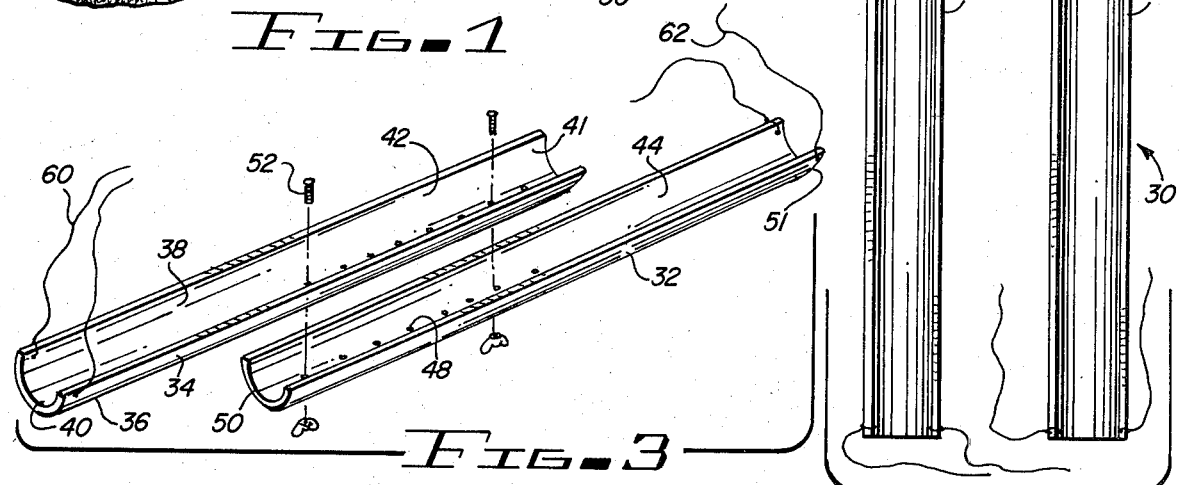
FIG-3
FIG-2
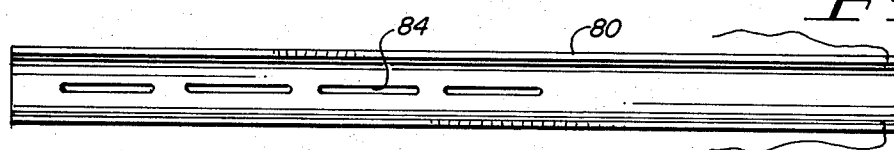
FIG-4
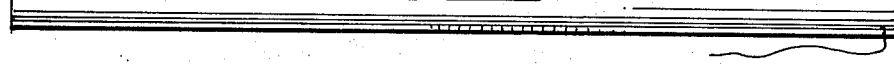
FIG-5
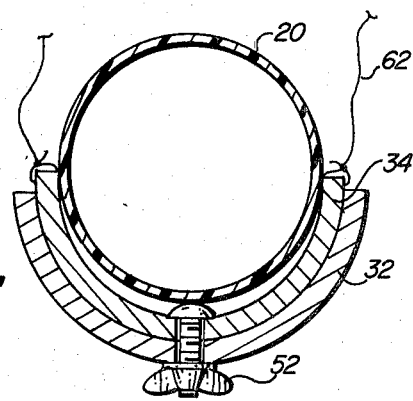
FIG-6

RECREATIONAL VEHICLE SEWER HOSE SUPPORT

The present invention relates to a support for a flexible hose and more particularly relates to a support for a sewer hose of the type connectible between a recreational vehicle and a sewage holding tank.

In recent years, recreational vehicles (RV's) have become increasingly popular. RV's include such types of vehicles as motor homes, straight side trailers, fifth-wheel trailers and travel trailers. Many of these vehicles are quite luxurious including many conveniences such as running water, showers and toilet facilities. The waste or discharge from these conveniences is generally received and contained in a self-contained holding tank in the vehicle when the vehicle is not in a camp or location where a holding tank can be connected to a sewer or dump tank. It is generally customary when the vehicle is parked in a camp or park to connect the vehicle holding tank directly to a sewer or dump tank. Generally this is done by means of flexible sewer or discharge hose having a quick-connect coupling at one end which can be secured to the vehicle. The opposite end of the hose is inserted into the sewer or holding tank and the dump valve opening allowing the waste to be discharged from the holding tank. Generally the sewer hose is approximately 6 to 8 feet in length to accomodate various arrangements for the dump tank or sewer and to allow the vehicle operator some latitude in parking the vehicle. Since a hose is flexible, the weight of the waste material may cause the hose to sag or bend impeding or restricting flow of the waste material through the hose. Accordingly, it is common practice among RV operators to secure and stabilize the hose in any convenient manner using materials at hand such as boards, rocks and the like. Obviously, such means of securing the hose are at best make-shift and at worst ineffective.

Some attempts have been made in the prior art to provide various devices for stabilizing and securing discharge or serew hoses from RV's. Most of these involve use of wire frames or cages which in themselves are difficult to erect and do not provide the degree of stability required. Accordingly, there exists a need for a simple and effective apparatus for securing RV sewer hoses in position during time the hoses are secured to a sewer or dump tank.

Briefly, the present invention comprehends a sewer hose support apparatus having at least two rigid members arranged in telescoping relationship slidable relative one to the other. Preferably, the sections are configured having a semi-circular surface generally corresponding to the diameter of the sewer hose. Apertures are provided in the two sections which are adapted to receive fasteners so the sections may be telescopically adjusted to the desired length. Securement means are provided on the sections for attachment of the support to the sewer hose near opposite ends of the hose. In preferred embodiment, the support is fabricated as a generally semi-circular trough of polyvinylchloride (PVC) or other suitable plastic material.

The above and other advantages and features of the present invention will be more fully understood from the following description, claims and drawings in which:

FIG. 1 is a fragmentary perspective view illustrating the sewer hose support of the present invention attached to a sewer hose of a recreational vehicle;

FIG. 2 is a plan view of the support sections;

FIG. 3 is an exploded perspective view of the support sections;

FIG. 4 is a plan view illustrating an alternate embodiment of one of the support sections;

FIG. 5 is a plan view of an alternate form of the support sections cooperable with the section shown in FIG. 4; and FIG. 6 is a sectional view taken along lines 6—6 of FIG. 1.

Turning now to the drawings, a typical RV 10 is partially shown being transportable on dual pneumatic tires 12. The body of vehicle 10 houses an appropraite sewer or waste holding tank, now shown, having an outlet terminating at coupling 16. A dump valve 18 is positioned ahead of coupling 16. Sewer hose 20, which is generally constructed as a rubber or plastic member appropriately reinforced by wire so as to provide flexibility, has one end inserted in inlet 22 leading to an appropriate sewer or dump tank. The opposite end of sewer hose 20 is provided with a coupling member 24 which is engageable with coupling 18 at the RV. Hose 20 is shown as being rigidly secured by support 30 of the present invention.

Support 30 is better illustrated in FIGS. 2 and 3. The hose support includes two or more substantially identical sections 32 and 34. Section 34 is shown as being an elongate trough terminating at opposite ends 40 and 41. Section 34 has an outer semi-circular surface 36 and an inner semi-circular surface 38 generally conforming to a portion of the circumference of a sewer hose 20. A series of spaced-apart holes or apertures 42 are axially spaced-apart about the bottom of section 32 extending from approximately the middle to one end 41.

Section 32 is a trough formed similar to section 34 having inner surface 44 adapted to receive the outer surface 36 of section 34 so the sections can be telescoped or moved relative to one another as seen in FIG. 6. Section 32 is provided with a series of spaced-apart longitudinally extending holes 48 extending from the approximate middle of section 32 to adjacent one end 50. With sections 32 and 34 placed in engagement, holes 44 and 48 may be variously aligned to vary the effective length of the support fasteners 52, shown as comprising a screw and wing nut, may be inserted through the aligned holes 44 and 42 to secure sections 32 and 34 in various relative positions.

The hose support may be secured to the hose 20 by ties 60 and 62 which are shown as lengths of nylon or other cord secured near the upper longitudinal edges of the sections adjacent end 40 of section 34 and adjacent end 51 of section 32. Other types of fasteners such as bands of resilient material or shock cords can similarly be used.

A more complete understanding of the present invention will be had from the following description of use. The RV 10 is parked in a location adjacent dump tank inlet 22. Hose 20 is coupled to the holding tank at coupling 16. The discharge end of the hose is positioned at sewer inlet 22. Hose support 30 is extended by removing fasteners 52 and sliding sections 32 and 34 relative to one another until desired length is reached. Holes 44 and 48 are aligned and fasteners 52 secured in place. Support 30 is placed in engagement with the lower portion of the hose 20. Section 34 is secured near the discharge end by securing ties 60 about the hose. Similarly, end 51 of section 34 is secured to the upper end of hose 20 or to coupling 16 or 18 by tie 62. With the support in place as shown, the hose is maintained in a rigid, stable position. The hose 20 cannot bend, crimp or sag in any way to interfere with the flow through the pipe. The pipe support also reimforces hose 20 to minimize the possibility of damage to hose.

An alternate embodiment of the present invention is shown in FIGS. 4 and 5 and includes two elongate sections 80 and 82. Again, each of the sections 80 and 82 have a generally semi-circular configuration. Section 80 is provided with a series of axial spaced-apart slots 84. Section 82 is provided with an axially extending slot 86. In other respects, the construction of the embodiment shown in FIGS. 4 and 5 is the same as that as has been shown and described with respect to FIGS. 1 through 3. The sections 80 and 82 are placed and slots 84 and 86 in alignment. Section 80 can be adjusted relative to section 84 until the required length of the support is obtained and fasteners inserted through the slots 84 and 86 to secure the sections as a unitary structure.

It will be obvious to those skilled in the art to make various changes, alterations and modifications to the hose support described herein. For example, the support may be made of various materials and the particular corss-sectional shape either can be varied. Similarly, it will be obvious to those skilled in the art to add additional sections in the event it is desired to extend the effective overall length of the unit. To the extent that these various changes alterations and modifications do not depart from the spirit and scope of the appended claims, they are intended to be encompassed therein.

I claim:

1. A hose support device for supporting a flexible sewer hose attached to an RV when discharging waste to a dumping location; said hose support comprising:
   (a) a first generally elongate rigid section having a generally trough-like cross-section adapted to receive at least a portion of said hose; said first section having opposite first and second ends and being substantially free of any projections;
   (b) a second generally elongate rigid section having a generally trough-like cross-section and being substantially free of any projections and adapted to be slidable relative to said first section; said second section having opposite first and second ends;
   (c) said first and second sections each defining at least one aperture extending therethrough which apertures may be selectively aligned;
   (d) fastening means cooperative with said apertures for securing said sections together at a desired length; and
   (e) flexible tie means associated with the first end of said first section and the second end of said second section whereby the support is engageable with said hose and securable thereabout as said ties adjacent both ends of said support.

* * * * *